United States Patent
Tijssen et al.

(10) Patent No.: US 9,139,941 B2
(45) Date of Patent: Sep. 22, 2015

(54) SHEET HAVING HIGH WATER VAPOR PERMEABILITY

(75) Inventors: Pascal M. H. P. Tijssen, Grootgenhouterstraat (NL); Pieter Gijsman, Hoogland (NL)

(73) Assignee: DSM IP ASSETS B.V., Heerlen (NL)

( * ) Notice: Subject to any disclaimer, the term of this patent is extended or adjusted under 35 U.S.C. 154(b) by 605 days.

(21) Appl. No.: 13/145,967

(22) PCT Filed: Feb. 3, 2010

(86) PCT No.: PCT/EP2010/051284
§ 371 (c)(1),
(2), (4) Date: Jul. 22, 2011

(87) PCT Pub. No.: WO2010/094559
PCT Pub. Date: Aug. 26, 2010

(65) Prior Publication Data
US 2011/0274905 A1    Nov. 10, 2011

(30) Foreign Application Priority Data
Feb. 17, 2009   (EP) .................................... 09153044

(51) Int. Cl.
| | |
|---|---|
| *C08K 5/3492* | (2006.01) |
| *C08L 67/00* | (2006.01) |
| *E04D 5/06* | (2006.01) |
| *D04H 13/00* | (2006.01) |
| *C08K 5/17* | (2006.01) |
| *E04D 12/00* | (2006.01) |
| *C08L 67/02* | (2006.01) |
| *C08K 5/34* | (2006.01) |

(52) U.S. Cl.
CPC *D04H 13/00* (2013.01); *C08K 5/17* (2013.01); *C08K 5/34* (2013.01); *C08L 67/025* (2013.01); *E04D 12/002* (2013.01)

(58) Field of Classification Search
CPC ...................................................... C08L 67/025
See application file for complete search history.

(56) References Cited

U.S. PATENT DOCUMENTS 6,380,290 B1 * 4/2002 Bonte et al. ................... 524/198
6,534,585 B1   3/2003 Dijkstra et al.

FOREIGN PATENT DOCUMENTS

WO   WO 02/103099     12/2002
WO   WO 2004/108410   12/2004

OTHER PUBLICATIONS

Drobny, J.G. "Chapter 3: Additives". Handbook of Thermoplastic Elastomers, William Andrew Publishing, (2007); pp. 13-27.*
International Search Report for PCT/EP2010/051284, mailed Apr. 6, 2010.

* cited by examiner

*Primary Examiner* — Prashant J Khatri
(74) *Attorney, Agent, or Firm* — Nixon & Vanderhye P.C.

(57) ABSTRACT

Sheet that has a moisture vapor transmission rate (MVTR) of at least 100 g/m²·day measured according to ISO 12572B at 1 bar, 23° C. and 85% relative humidity and that contains a film of a polymer composition containing a polar thermoplastic elastomer, a hindered amine light stabilizer (HALS) and or a UV absorber and an aromatic amine radical scavenger. The sheet suitable to be used as a roofing membrane.

7 Claims, No Drawings

SHEET HAVING HIGH WATER VAPOR PERMEABILITY

This application is the U.S. national phase of International Application No. PCT/EP2010/051284, filed 3 Feb. 2010, which designated the U.S. and claims priority to EP Application No. 09153044.4, filed 17 Feb. 2009, the entire contents of each of which are hereby incorporated by reference.

The invention relates to a sheet that has a moisture vapor transmission rate (MVTR) of at least 100 g/m$^2$·day measured according to ISO 12572B at 1 bar, 23° C. and 85% relative humidity and that contains a film of a polymer composition containing a polar thermoplastic elastomer, a hindered amine light stabilizer (HALS) and/or a UV absorber. An important application of such a sheet is roofing membrane.

It is important for this application that the sheet has a high durability. This means that physical properties, mechanical properties and integrity of the sheet must be maintained for a long period of time. Especially important are properties like UV resistance, chemical resistance and dimensional stability.

Roofing membranes are often applied at pitched roofs, below the roof covering, for example below tiles, slates etc. Such a roofing membrane is a barrier for water to penetrate into buildings, for example coming from leakages in the roof covering, formed by melting of fine snow that has been blown through gaps between tiles, or due to water penetration by driving rains. However, since the sheet has an adequate permeability for water vapor (also expressed as moisture vapor transmission rate), humidity that tends to accumulate in buildings is released, keeping the indoor condition dry enough to ensure the good health of people living or working in the buildings and to avoid rot in wooden structures of buildings, for example in wooden beams of the roof construction.

After application at the roof the sheet is occasionally exposed for several months, up to four month is a period normally accepted by roof builders, to UV radiation by sunlight, before the roof covering is applied. Also after the covering is applied exposure might continue, because of openings in the roof covering, letting rays of sunlight through. From EP-A-6.534.585 a sheet is known that contains a film of a polymer composition that comprises a thermoplastic polyester (TPE), a hindered amine light stabilizer (HALS) and active carbon as UV-absorber. Because such a sheet contains the TPE, it has sufficient water vapor permeability, so that it is very suited to be used as roofing membrane. Although the sheet contains both an UV stabilizer and an UV absorber to guarantee a high durability, there is still need for a sheet with a further improved durability.

A sheet having a further improved durability is obtained if the polymer composition of the sheet contains an aromatic amine radical scavenger.

Surprisingly the durability of the sheet is highly improved if the aromatic amine radical scavenger is present in the polymer composition of the film. Such a sheet is especially suitable to be used as roofing membrane, because important properties like water tightness, water vapor permeability and mechanical properties are better maintained. This is very important, since durability of building materials often has to be guaranteed and also the desired life time of the sheet is at least several decades, or as long as the roof covering lasts.

The thickness of the film of the sheet according to the invention is for example between 10 and 100 microns. The invention is especially useful for films with a thickness below 50 microns, more preferably below 30 microns. This is because durability of films with such a low thickness is especially critical, as they are more sensible to attack of UV and other environmental influences, whereas it is desirable to use such thin films, for economic reasons and because such thin films and sheets containing the films are very easy to handle.

The sheet according to the invention may be a laminate containing a film of the composition and at least one layer that consist of a non-woven or needle punched fleece. In one embodiment the sheet according to the invention consists of three layers, whereby the two outer layers consist of the fleece and the central layer is the film of the polymer composition. In a further embodiment the sheet consists of two layers, one layer is the fleece and the other layer is the film.

Fixation of the fleece and the film can for example be done by lamination, heat sealing, chemical bonding or extrusion coating.

In a preferred embodiment the sheet consists of the film of the polymer composition. Such sheets are also referred to as monolitic films. The advantage of a monolitic film is that the film is easy to produce and is yet very flexible at low temperatures, making the film resistant against mechanical stresses caused by winds at low temperatures.

The polymeric composition of the film of the sheet according to the invention contains a polar thermoplastic elastomer.

Films of the polymeric composition comprising a polar thermoplastic elastomer are a barrier for water, but are permeable for water vapor. The water vapor permeability of the film containing a certain type of polar thermoplastic elastomer increases with decreasing thickness.

A good example of a suitable thermoplastic elastomer is a thermoplastic polyurethane (TPU). TPU's may be formed by the reaction between isocyanates, short chain doils or diamines and long chain diols or diamines. Preferably as long chain diols polyetherdiols are used.

Preferably a thermoplastic polyester elastomer (TPE) is used as the polar thermoplastic elastomer. More preferably a polyether ester is used as the thermoplastic polyester elastomer.

The copolyether ester suitably contains hard segments that are built up from repeating units derived from at least one alkylene diol and at least one aromatic dicarboxylic acid or an ester thereof. As alternative to segment, also the term block is being used. The linear or cycloaliphatic alkylene diol contains generally 2-6 C-atoms, preferably 2-4 C-atoms. Examples thereof include ethylene glycol, propylene diol and butylene diol. Preferably propylene diol or butylene diol are used, more preferably 1,4-butylene diol. Examples of suitable aromatic dicarboxylic acids include terephthalic acid, 2,6-naphthalenedicarboxylic acid, 4,4'-biphenyldicarboxylic acid or combinations of these. The advantage thereof is that the resulting polyester is generally semi-crystalline with a melting point of above 150, preferably above 175, and more preferably of above 190° C. The hard segments may optionally further contain a minor amount of units derived from other dicarboxylic acids, for example isophthalic acid, which generally lowers the melting point of the polyester. The amount of other dicarboxylic acids is preferably limited to not more than 10, more preferably not more than 5 mol %, so as to ensure that, among other things, the crystallization behaviour of the copolyether ester is not adversely affected. The hard segment is preferably built up from ethylene terephthalate, propylene terephthalate, and in particular from butylene terephthalate as repeating units. Advantages of these readily available units include favourable crystallisation behaviour and a high melting point, resulting in copolyether esters with good processing properties, excellent thermal and chemical resistance and good puncture resistance.

Suitable aliphatic polyether soft segments in the copolyether ester of component (a) are flexible polyethers that are substantially amorphous and have a glass-transition temperature ($T_g$) of below 0° C. Preferably, the $T_g$ is below −20° C., more preferably below −40, and most preferably below −50° C. The molar mass of the segments may vary within a wide range, but preferably the molar mass is chosen between 400 and 6000, more preferably between 500 and 4000, and most preferably between 750 and 3000 g/mol. Suitable aliphatic polyethers include a poly(alkylene oxide)diol derived from an alkylene oxide of 2-6 C-atoms, preferably 2-4 C-atoms, or combinations thereof. Examples include poly(ethylene oxide)diol, poly(tetramethylene oxide)diol or poly(tetrahydrofuran)diol, poly(neopentylene oxide-co-tetramethylene oxide) diol, poly(propylene oxide)diol and ethylene oxide-terminated poly(propylene oxide)diol. High durability of the sheet according to the invention is obtained if the copolyether ester contains as polyether segments polypropylene glycol segments, polyethylene glycol segments and/or polytetrahydrofuran segments. Polytetrahydrofuran segments provide the best durability, polyethylene glycol segments provide a combination of high durability and high vapour permeability The copolyether ester may further contain a compound with two or more functional groups that can react with an acid- or hydroxyl-group, acting as chain extension or chain branching agent, respectively. Examples of suitable chain extension agents include carbonylbislactams, diisocyanates and bisepoxides. Suitable chain branching agents include e.g. trimellitic acid, trimellitic acid anhydride and trimethylol propane. The amount and type of chain extension or branching agent is chosen such that a block copolyester of desirable melt viscosity is obtained. In general, the amount of a chain branching agent will not be higher than 6.0 equivalents per 100 moles of dicarboxylic acids presenting the copolyether ester. The copolyether ester can further contain the usual catalysts and stabilisers.

Examples and preparation of copolyether esters are for example described in Handbook of Thermoplastics, ed. O. Olabishi, Chapter 17, Marcel Dekker Inc., New York 1997, ISBN 0-8247-9797-3, in Thermoplastic Elastomers, 2nd Ed, Chapter 8, Carl Hanser Verlag (1996), ISBN 1-56990-205-4, in Encyclopedia of Polymer Science and Engineering, Vol. 12, Wiley & Sons, New York (1988), ISBN 0-471-80944, p. 75-117, and the references cited therein.

Particularly preferred is a copolyether ester with hard segments built up from butylene terephthalate units and soft segments derived from ethylene oxide-terminated poly(propylene oxide)diol. The ratio of amounts of propylene oxide and ethylene oxide in such a polyether may vary within a wide range, for example between 20:1 and 1:6, but is preferably between 10:1 and 1:1, even more preferably between 5:1 and 1:1. Advantages of such a polyether segment are improved performance at low temperatures, and also at elevated temperatures due to better retention of crystallinity of the polyester hard segment in the copolyether ester.

The films may suitably be prepared by extrusion.

Moisture vapor transmission rate (MVTR) is measured according to ISO 12572, condition B at 1 bar, 23° C. and 85% relative humidity. The distance between the test sample and the desiccant is 10 mm. The MVTR is at least 100 g/m²·day, more preferably at least 200 g/m²·day, even more preferably at least 300 g/m²·day, most preferably at least 400 g/m²·day.

The polymer composition preferably contains the HALS in an amount of between 0.001 and 10% by weight, more preferably between 0.01 and 5% by weight, most preferably between 0.1 and 1.5% by weight, based on the total weight of the polymer composition.

Preferably, the HALS chosen is a compound derived from a substituted piperidine compound, in particular any compound which is derived from an alkyl-substituted piperidyl, piperidinyl or piperazinone compound or a substituted alkoxypiperidinyl compound.

Examples of such compounds are: 2,2,6,6-tetramethyl-4-piperidone; 2,2,6,6-tetramethyl-4-piperidinol; bis-(1,2,2,6,6-pentamethylpiperidyl)-(3',5'-di-tert-butyl-4'-hydroxybenzyl) butylmalonate; di-(2,2,6,6-tetramethyl-4-piperidyl)sebacate (Tinuvin® 770); oligomer of N-(2-hydroxyethyl)-2,2,6,6-tetramethyl-4-piperidinol and succinic acid (Tinuvin® 622); bis-(2,2,6,6-tetramethyl-4-piperidinyl)succinate; bis-(1-octyloxy-2,2,6,6-tetramethyl-4-piperidinyl)sebacate (Tinuvin® 123); bis-(1,2,2,6,6-pentamethyl-4-piperidinyl)sebacate (Tinuvin® 765); N,N'-bis-(2,2,6,6-tetramethyl-4-piperidyl)hexane-1,6-diamine (Chimassorb® T5); N-butyl-2,2,6,6-tetramethyl-4-piperidinamine; 2,2'-[(2,2,6,6-tetramethylpiperidinyl)imino]-bis-[ethanol]; poly((6-morpholine-S-triazine-2,4-diyl)(2,2,6,6-tetramethyl-4-piperidinyl)-iminohexamethylene-(2,2,6,6-tetramethyl-4-piperidinyl)-imino) (Cyasorb® UV 3346); 5-(2,2,6,6-tetramethyl-4-piperidinyl)-2-cyclo-undecyloxazole) (Hostavin® N20); 8-acetyl-3-dodecyl-7,7,9,9-tetramethyl-1, 3,8-triaza-spiro(4,5)decane-2,4-dione; polymethylpropyl-3-oxy[4(2,2,6,6-tetramethyl)-piperidinyl)siloxane (Uvasil® 299); copolymer of α-methylstyrene-N-(2,2,6,6-tetramethyl-4-piperidinyl)maleimide and N-stearylmaleimide; 1,2,3,4-butanetetracarboxylic acid, polymer with beta,beta,beta',beta'-tetramethyl-2,4,8,10-tetraoxaspiro[5.5]undecane-3,9-diethanol, 1,2,2,6,6-pentamethyl-4-piperidinyl ester (Mark® LA63); 2,4,8,10-tetraoxaspiro[5.5]undecane-3,9-diethanol, beta,beta,beta',beta'-tetramethyl-, polymer with 1,2,3,4-butanetetracarboxylic acid, 2,2,6,6-tetramethyl-4-piperidinyl ester (Mark® LA68); D-glucitol, 1,3:2,4-bis-O-(2,2,6,6-tetramethyl-4-piperidinylidene)-(HALS 7); oligomer of 7-oxa-3,20-diazadispiro[5.1.11.2]heneicosan-21-one,2,2,4,4-tetramethyl-20-(oxiranylmethyl) (Hostavin® N30); propanedioic acid, [(4-methoxyphenyl)methylene]-bis(1,2, 2,6,6-pentamethyl-4-piperidinyl)ester (Sanduvor® PR 31); formamide, N,N'-1,6-hexanediylbis[N-(2,2,6,6-tetramethyl-4-piperidinyl (Uvinul® 4050H). 1,3,5-triazine-2,4,6-triamine, N,N'''-[1,2-ethanediylbis[[[4,6-bis[butyl(1,2,2,6,6-pentamethyl-4-piperidinyl)amino]-1,3,5-triazine-2-yl] imino]-3,1-propanediyl]]-bis[N'',N''-dibutyl-N'',N'-bis(1,2, 2,6,6-pentamethyl-4-piperidinyl) (Chimassorb® 119); 1,5-dioxaspiro (5,5) undecane 3,3-dicarboxylic acid, bis(2,2,6,6-tetramethyl-4-peridinyl)ester (Cyasorb® UV-500); 1,5-dioxaspiro (5,5) undecane 3,3-dicarboxylic acid, bis(1,2,2,6, 6-pentamethyl-4-peridinyl)ester (Cyasorb® UV-516); N-2,2, 6,6-tetramethyl-4-piperidinyl-N-amino-oxamide; 4-acryloyloxy-1,2,2,6,6-pentamethyl-4-piperidine; HALS PB-41 (Clariant Huningue S.A.); 1,3-benzendicarboxamide, N,N'-bis(2,2,6,6-tetramethyl-4-piperidinyl) (Nylostab® S-EED (Clariant Huningue S.A.)); 3-dodecyl-1-(2,2,6,6-tetramethyl-4-piperidyl)-pyrrolidin-2,5-dione; 1,3-Propanediamine, N,N-1,2-ethanediylbis-,polymer with 2,4,6-trichloro-1,3,5-triazine, reaction products with N-butyl-2,2,6,6-tetramethyl-4-piperidinamine (Uvasorb® HA88); 1,1'-(1,2-ethane-di-yl)-bis-(3,3',5,5'-tetra-methyl-piperazinone) (Good-Rite® 3034); 1,1',1''-(1,3,5-triazine-2,4,6-triyltris ((cyclohexylimino)-2,1-ethanediyl)tris(3,3,5,5-tetramethylpiperazinone); (Good-Rite® 3150); 1,1',1''-(1,3,5-triazine-2,4,6-triyltris((cyclohexylimino)-2,1-ethanediyl)tris(3,3,4,5, 5-tetramethylpiperazinone) (Good-Rite® 3159); 1,2,3,4-Butanetetracarboxylic acid, tetrakis(2,2,6,6-tetramethyl-4-piperidinyl) ester (ADK STAB® LA-57) 1,2,3,4-Butanetetra-carboxylic acid, 1,2,3-tris-(1,2,2,6,6-penta-methyl-4-piperidyl)-4-tridecylester (ADK STAB® LA-62). Mixture of esters of 2,2,6,6-tetra-methyl-4-pipiridinol and several fatty acid (CYASORB® UV3853); Propanedioic acid, [(4-methoxyphenyl)methylene]-bis(2,2,6,6-tetramethyl-4-piperidinyl) ester (HOSTAVIN® PR-31); 3-Dodecyl-1-(2,2,6,6-tetramethyl-4-piperidyl)-pyrrolidin-2,5-dione (CYASORB® UV3581); 3-Dodecyl-1-(1,2,2,6,6-pentamethyl-4-piperidyl)-pyrrolidin-2,5-dione (CYASORB® UV3641); 1,2,3,4-Butanetetracarboxylic acid, tetrakis(1,2,2,6,6-pentamethyl-4-piperidinyl)ester (ADK STAB® LA-52); 1,2,3,4-Butane-tetra-carboxylic acid, 1,2,3-tris-(2,2,6,6-tetramethyl-4-piperidyl)-4-tridecylester (ADK STAB® LA-67); Mixture of: 2,2,4,4 tetramethyl-21-oxo-7-oxa-3,20-diazadispiro[5.1.11.2]-heneicosane-20-propionic acid dodecylester and 2,2,4,4 tetramethyl-21-oxo-7-oxa-3,20-diazadispiro[5.1.11.2]-heneicosane-20-propionicacid tetradecylester (Hostavin® N24); Poly[[6-[(1,1,3,3-tetramethylbutyl)amino]-s-triazine-2,4-diyl][2,2,6,6-tetramethyl-4-piperidinyl)-imino]hexamethylene [(2,2,6,6-tetramethyl-4-piperidinyl)imino]]} (Chimassorb® 944); 1,3,5-Triazine-2,4,6-triamine, N,N''''-[1,2-ethanediylbis[[[4,6-bis[butyl(1,2,2,6,6-pentamethyl-4-piperidinyl)amino]-1,3,5-triazine-2-yl]imino]-3,1-propanediyl]]-bis[N',N''-dibutyl-N',N''-bis(1,2,2,6,6-pentamethyl-4-piperidinyl) (Chimassorb® 119); Poly[(6-morpholino-s-triazine-2,4-diyl)[1,2,2,6,6-penta-methyl-4-piperidyl)imino]-hexamethylene[(1,2,2,6,6 penta-methyl-4-piperidyl)imino]]1,6-Hexanediamine, N,N'-bis(1,2,2,6,6-pentamethyl-4-pipiridinyl)-, Polymers with morpholine-2,4,6-trichloro-1,3,5-triazine (CYASORB® UV3529); Poly-methoxypopyl-3-oxy[4(1,2,2,6,6-pentamethyl)-piperidinyl]-siloxane (Uvasil®816); 1,6-Hexanediamine, N,N'-bis(2,2,6,6-tetramethyl-4-piperidinyl)-polymer with 2,4,6-trichloro-1,3,5-triazine, reaction products with N-butyl-1-butanamine and N-butyl-2,2,6,6-tetramethyl-4-piperidinamine (Chimassorb® 2020); Reaction products of N,N'-ethane-1,2-diylbis(1,3-propanediamine), cyclohexane, peroxidized 4-butylamino-2,2,6,6-tetramethylpiperidine and 2,4,6-trichloro-1,3,5-triazine (Flamestab NOR® 116); 1,6-hexanediamine, N,N'-bis(2,2,6,6-tetramethyl-4-piperidinyl)-, polymer with 2,4,6-trichloro-1,3,5-triazine, reaction products with 3-bromo-1-propene, n-butyl-1-butanamine and N-butyl-2,2,6,6-tetramethyl-4-piperidinamine, oxidised, hydrogenated (Tinuvin NOR® 371).

Preferably, the HALS has a molecular mass of 1000 g/mol or more, more preferably 1500 g/mol or more. These HALS's are especially suitable for use if the sheets contain a film of a polymer composition comprising a polar thermoplastic elastomer that has a thickness below 50 microns, preferably below 30 microns.

A UV absorber is a compound that inhibits the degradation of a polymer that is induced by UV-light and that is not a HALS.

The polymer composition preferably contains an UV absorber in an amount of between 0.001 and 10% by weight, more preferably between 0.01 and 4% by weight.

Examples of UV-absorbers are pigments. Like for example carbon black, titanium dioxide, zinc oxide and organic chemical compounds, like for example hydroxybenzophenones, hydroxybenzotriazoles, triazines, anilides, benzoates, cyanoacrylates and phenylformamidines.

Examples of hydroxybenzophenones include 2-hydroxy-4-n-octoxybenzophenone, 2-hydroxy-4-methoxybenzophenone, 2-propenoic acid, 2-(4-benzoyl-3-hydroxyphenoxy) ethyl ester, 2-hydroxy-4-n-dodecyloxy-benzophenone Poly-4-(2-acryloyloxyethoxy)-2-hydroxybenzophenone, bis-(2-methoxy-4-hydroxy-5-benzoyl-phenyl)-methane and [2-hydroxy-4-(2-hydroxyethoxy)phenyl]phenyl-methanone.

Examples of hydroxybenzotriazoles include 2-(2'-Hydroxy-3',5'-di-t-butyl-phenyl)-benzotriazole, 2-(2'-hydroxy-3'-t-butyl-5'-methylphenyl)-5-chlorobenzotriazole, 2-(5-chloro-2H-benzotriazol-2-yl)-4,6-bis-(1,1-dimethylethyl)-phenol, 2-(2'-hydroxy-3,5'-di-t-amylphenyl)benzotriazole, 2-(2H-benzotriazol-2-yl)-4-methyl-phenol, 2-(2H-benzotriazol-2-yl)-4-(1,1-dimethylethyl)-phenol, 2-(2H-benzotriazol-2-yl)-4-(1,1,3,3-tetramethylbutyl)-phenol, 3-(2H-benzotriazole-2-yl)-5-(1,1-dimethylethyl)-4-hydroxy-1,6-hexanediylester of benzene propanoic acid, bis[2-hydroxy-5-t-octyl-3-(benzotriazol-2-yl)phenylmethane, 2-[2-hydroxy-3,5-di(1,1-dimethylbenzyl)phenyl]2H-benzotriazole, bis[2-hydroxy-5-methyl-3-(benzotriazol-2-yl)phenyl]methane, 2-(2H-benzotriazol-2-yl)-4-(1,1-dimethylethyl)-6-(2-methylpropyl)-phenol, 2-(2H-benzotriazole-2-yl)-4-methyl-6-dodecyl phenol, reaction product of β-[-3-(2-H-Benzotriazol-2-yl)-4-hydroxy-5-tert.butylphenyl]-propionic acid-methyl ester and polyethyleneglycol 300, 3-(2H-benzotriazol-2-yl)-5-(1,1-dimethylethyl)-4-hydroxy-benzenepropanoic acid, 2-(2H-benzotriazol-2-yl)-6-(1-methyl-1-phenylethyl)-4-(1,1,3,3-tetramethylbutyl)phenol, 2-(2'-hydroxy-5'-(2-hydroxyethyl))-benzotriazole, 2-(2-hydroxy-4-octyloxyphenyl)-2H-benzotriazole, 2-[4-[4,6-bis([1,1'-biphenyl]-4-yl)-1,3,5-triazin-2-yl]-3-hydroxyphenoxy]-propanoic acid isooctyl ester, octyl-3-[3-tert-butyl-4-hydroxy-5-(5-chloro-2H-benzotriazole-2-yl)fenyl] propionaat+2-, ethylhexyl-3-[3-tertbutyl-4-hydroxy-5-(5-chloro-2H-benzotriazole-2-yl)fenyl]propionaat and 2-(2H-benzotriazol-2-yl)-6-[[3-(1,1-dimethylethyl)-2-hydroxy-5-methylphenyl]methyl]-4-(1,1,3,3-tetramethylbutyl)-phenol.

Examples of triazines include 2-[4,6-diphenyl-1,3,5-triazin-2-yl]-5-(hexyl)oxy-phenol, 2-[4,6-bis(2,4-dimethylphenyl)-1,3,5-triazin-2-yl]-5-(octyloxy)-phenol, 2-[4-[(2-hydroxy-3-(2'-ethyl)hexyl)oxy]-2-hydroxyphenyl]-4,6-bis (2,4-dimethylphenyl)-1,3,5-triazine, 2,4-bis[2-hydroxy-4-butoxyphenyl]-6-(2,4-dibutoxyphenyl)-1,3,5-triazine, 5,5'-bis(2-ethylhexyloxy)-2,2'-[6-(4-methoxyphenyl)-1,3,5-triazine-2,4-diyl]diphenol and a mixture of: 2-[4-[(2-Hydroxy-3-dodecyloxypropyl)oxy]-2-hydroxyphenyl]-4,6-bis(2,4-dimethylphenyl)-1,3,5-triazine and 2-[4-[(2-Hydroxy-3-tridecyloxypropyl)oxy]-2-hydroxyphenyl]-4,6-bis(2,4-dimethylphenyl)-1,3,5-triazine in 1-methoxy-2-propylacetate, Examples of anilides include 2-ethoxy-5-t-butyl-2'-ethyl-oxalanilide, 2-ethyl, 2'-ethoxy-oxalanilide and N-(2-ethoxyphenyl)-N'-(4-iso-dodecyl-phenyl)-ethanediamine.

Examples of benzoates include 3,5-di-t-butyl-4-hydroxybenzoic acid, n-hexadecyl ester, 4-t-butyl-phenyl-salicylate, benzoic acid, 3,5-bis(1,1-dimethylethyl)-4-hydroxy-2,4-bis (1,1-dimethylethyl)phenyl ester and benzoic acid, 2-hydroxy-, phenyl ester.

Examples of cyanoacrylates include ethyl 2-cyano-3,3-diphenylacrylate 2-Ethylhexyl 2-cyano-3,3-diphenylacrylate and 1,3-bis-[2'-cyano-3',3-diphenylacryloyl)oxy]-2,2-bis-{[2-cyano-3',3'-diphenylacryloyl)oxy]methyl}propane.

Examples of phenylformamidines include the ethyl ester of 4-[[(methylphenylamino)methylene]amino]-benzoic acid and N-(p-Ethoxy-carbonylphenyl)-N'-ethyl-N'-phenylformamidine.

Further examples of UV absorbers include 3-(4-methoxyphenyl)-, 2-ethylhexyl ester of 2-propenoic acid, [(4-methoxyphenyl)-methylene]-dimethyl ester of Propanedioic acid, tetra-ethyl-2,2'-(1,4-phenylene-dimethylidene)-bismalonate, 1,4-bis(4-benzoyl-3-hydroxyphenoxy)-butane and 2,2'-(1,4-phenylene)bis[4H-3,1-benzoxazin-4-one].

Preferably carbon black is used.

The polymer composition of the sheet according to the invention preferably contains a HALS. More preferably the composition contains a HALS and an UV-absorber.

The polymer composition preferably contains an aromatic amine in an amount of between 0.001 and 10% by weight, more preferably between 0.01 and 5% by weight, most preferably between 0.1 and 1.5% by weight, based on the total weight of the polymer composition.

Examples of aromatic amines are: 4,4'-di-cumyl-di-phenyl-amine; N,N'-diphenyl-p-phenylenediamine; 2,2,4-trimethyl-1,2-dihydroquinoline polymer; 4,4'-dioctyl-diphenylamine; 1,4-benzenediamine, N,N'-bis(1-methylpropyl); N-Isopropyl-N'-phenyl-paraphenylenediamine; N-1,3-dimethyl-butyl-N'-phenyl-paraphenylene-diamine; N,N'-Bis(1,4-dimethylpentyl)-p-phenylenediamine; 2-Naphthalenamine, N-phenyl-; 1,4-benzenediamine, N-(1-methylethyl)-N'-phenyl-; benzenamine, N-phenyl-reaction product with 2,4,4 trimethyl pentane; 1,4-benzenediamine, N,N'-bis[4-(1-phenylethyl)phenyl]-; p-(p-toluene-sulfonylamido)-diphenylamine; benzeneamine, N-{4-[(1,3-dimethylbutyl)imino]-2,5-cyclohexadien-1-ylidine; N-phenyl-N'-1-phenylethyl-1,4-phenylenediamine;

The invention also relates to the use of the sheet according to the invention in clothing, as membranes in buildings and as packaging material.

If used in clothing the sheet is used as a layer to make the clothing water proof, however body moisture may go out, because the sheet has a sufficient level of water vapor permeability, the clothing is comfortable to wear. In clothing durability is affected by the exposure to sunlight, even if the sheet is not the most outer layer of the clothing, and at the same time by frequently washing and drying especially if drying is carried out in hot air drying machines.

The sheets are preferably used as roofing membranes, especially as roofing membrane of a pitched roof.

The invention is also directed to the polymer composition used in the film of the sheets according to the invention.

The invention is further explained by the examples, without being restricted thereto.

Compounds and Materials Used.
Radical Scavengers:
Naugard® 445 by Uniroyal Chemical (USA), an aromtic amine radical scavanger.
Irganox 1010 by Ciba Specialties Chemical (Schwitzerland).
Irgaphos PEPQ by Ciba Geigy Chemical (Schwitzerland).
Hindered Amine Light Stabilizer (HALS):
Chimassorb® 944 by Ciba Specialty Chemical (Schwitzerland)
Chimassorb® 119 by Ciba Specialty Chemical (Schwitzerland)
Tinuvin 371 by Ciba Specialty Chemicals (Schwitzerland).
Light Absorber:
Carbon Black
Thermoplastic Elastomer:
Arnitel EM400, a thermoplastic polyester elastomer, by DSM (the Netherlands).
Preparation of the Polymer Compositions:

Dry blends of the composition are prepared in a tumble mixer. The dry blends are thereafter extruded on a Bersdorf™ co-rotating twin screw extruder and processed into granulate. All composition are based on Arnitel EM400.
Preparation of the Films:

Films are produced from the granulate of the composition by extruding the composition by using a single screw extruder through a slit die, and casting the film on a Collin™ cast film line. The films are 30 μm thick.
Moisture Vapor Transmission Rate The MVTR is measured according to ISO 12572B at 1 bar, 23° C. and 85% relative humidity and expressed in $g/m^2 \cdot day$. A test sample, in this case a piece of the film, is adhered over the top of a test cup that is filled with desiccant. The distance between the film and the desiccant is 10 mm. The cup is placed in a conditioned chamber at above referred conditions. The moisture take up of the desiccant is measured.
Accelerated UV-Aging and Accelerated Further Aging The films are exposed to accelerated UV aging in an UVCON weathering device for 2 weeks. After the accelerated UV aging a further accelerated aging is carried out without light at 90° C. in an air ventilation oven. During testing several times the elongation was measured by using a Zwick tensile tester. The exposure time after which the elongation has decreased to 50% of the original value is taken as the life time of the sample. Values are given in table 1.

COMPARATIVE EXPERIMENTS A, B AND C AND EXAMPLES 1-6

In comparative experiments A, B and C and examples 1-6 films were made and tested as shown in table 1.

The MVTR of all films was well above 100 $g/m^2 \cdot day$.

In comparative experiment A the film contained no radical scavenger. In comparative experiments B and C the film contained respectively 0.50 wt. % Irgaphos PEPQ and 50 wt. % Irganox 1010 as radical scavenger. Both radical scavengers are however not an aromatic amine radical scavenger. It is observed that because of the addition of the radical scavenger there is a slight increase in life time of the films. However a large increase in the life time is observed for the films of the examples, which contain 0.50 wt. % naugard 445, an aromatic amine radical scavenger.

TABLE 1

| Comparative exp./example | Polymer | Carbon black Weight % | Hindered Amine Light Stabilizer (HALS) | | | Radical scavenger | | | Life Time Hours |
|---|---|---|---|---|---|---|---|---|---|
| | | | Chimassorb 944 Weight % | Chimassorb 119 Weight % | Tinuvin 371 Weight % | Naugard 445 Weight % | Irgaphos PEPQ Weight % | Irganox 1010 Weight % | |
| A | EM400 | 2.00% | 1.00% | | | | | | 696 |
| B | EM400 | 2.00% | 1.00% | | | | | 0.50% | 720 |
| C | EM400 | 2.00% | 1.00% | | | | 0.50% | | 672 |
| 1 | EM400 | 2.00% | 1.00% | | | 0.50% | | | 1488 |
| 2 | EM400 | 2.00% | 2.00% | | | 0.50% | | | 1536 |
| 3 | EM400 | 3.00% | 1.00% | | | 0.50% | | | 1560 |
| 4 | EM400 | 4.00% | 1.00% | | | 0.50% | | | 2496 |
| 5 | EM400 | 2.00% | | 1.00% | | 0.50% | | | 2424 |
| 6 | EM400 | 2.00% | | | 1.00% | 0.50% | | | 2280 |

The invention claimed is:

1. A roofing membrane comprising a film having a thickness of below 50 microns, wherein the film is formed of a polymer composition comprising:
   a polar thermoplastic copolyether ester elastomer, and
   a stabilization package consisting of:
      (i) 0.001-10% by weight of a hindered amine light stabilizer (HALS) selected from the group consisting of alkyl-substituted piperidyl compounds, piperdinyl compounds, piperazinone compounds and alkoxypiperidinyl compounds,
      (ii) 0.001-10% by weight of carbon black as a UV absorber, and
      (iii) 0.001-10% by weight of 4,4'-di-cumyl-di-phenyl-amine as a radical scavenger, wherein
   the roofing membrane has a moisture vapor transmission rate (MVTR) of at least 100 g/m$^2$·day measured according to ISO 12572(B) at 1 bar, 23° C. and 85% relative humidity.

2. The roofing membrane according to claim 1, wherein the copolyether ester contains polyethylene glycol segments.

3. The roofing membrane according to claim 1, wherein the polymer composition comprises between 0.1 and 1.5% by weight of the HALS.

4. The roofing membrane according to claim 1, wherein the polymer composition comprises between 0.01 and 4% by weight of the carbon black as a UV absorber.

5. The roofing membrane according to claim 1, wherein the polymer composition comprises between 0.1 and 1.5% by weight of the 4,4'-di-cumyl-di-phenyl-amine.

6. A roofing membrane comprising a film having a thickness of below 50 microns, wherein the film is formed of a polymer composition which consists of:
   a polar thermoplastic copolyether ester elastomer containing hard segments derived from butylene terephthalate and soft segments derived from ethylene oxide-terminated poly(propylene oxide)diol,
   0.1-1.5% by weight of a hindered amine light stabilizer (HALS) selected from the group consisting of alkyl-substituted piperidyl compounds, piperdinyl compounds, piperazinone compounds and alkoxypiperidinyl compounds,
   0.01-4% by weight of carbon black, and
   0.1-1.5% by weight of 4,4'-di-cumyl-di-phenyl-amine, wherein the roofing membrane has a moisture vapor transmission rate (MVTR) of at least 100 g/m$^2$·day measured according to ISO 12572(B) at 1 bar, 23° C. and 85% relative humidity.

7. The roofing membrane according to claim 6, wherein the polymer composition consists of the polar thermoplastic copolyether ester elastomer, 1.00 to 2.00% by weight of the HALS, 2.00 to 4.00% by weight of the carbon black and 0.50% by weight of the 4,4'-di-cumyl-di-phenyl-amine.

* * * * *